Patented Sept. 24, 1946

2,408,020

UNITED STATES PATENT OFFICE 2,408,020

PYRIDINE-3-ACETIC ACID AND DERIVATIVES THEREOF AND PROCESS OF PREPARING THE SAME

Max Hartmann and Karl Miescher, Riehen, Hans Kaegi, Basel, and Werner Bosshard, Riehen, Switzerland, assignors to Ciba Pharmaceutical Products, Incorporated, Summit, N. J.

No Drawing. Application March 9, 1942, Serial No. 434,006. In Switzerland December 23, 1940

7 Claims. (Cl. 260—295.5)

It has been found that pyridine-3-acetic acid or its derivatives are obtained if pyridine-2-carboxylic acid ester-3-carboxylic acid halides are caused to react with diazomethane, the corresponding diazoketones are then allowed to react with alcohols, preferably in the presence of catalysts, such as, for instance, silver and copper compounds, and the reaction product is treated, if desired, with hydrolysing agents, and/or, if desired, with decarboxylating agents.

Acetic acids of the aromatic and of the heterocyclic series have already been obtained from the corresponding carboxylic acids by way of their diazoketones. However, this reaction cannot be carried out in all cases with satisfactory results. Thus, for example, the work of Dornow, Berichte der Deutschen Chemischen Gesellschaft, vol. 73, page 157 (1940), indicates that the preparation of pyridine-3-diazoketone from nicotinic acid chloride hydrochloride and diazomethane only takes place with very poor yield, a fact that can be confirmed by our own experiments. This is certainly the reason why pyridine-3-acetic acid has not hitherto been prepared. Surprisingly enough, the preparation of pyridine-3-acetic acid and its derivatives may be carried out by the present process in a simple manner and with a good yield. In contrast to the experiments with nicotinic acid chloride hydrochloride mentioned above, the corresponding diazoketones are obtained in good yield, and these, in their turn, may be converted into the pyridine-3-acetic acids, also with good yields.

The parent materials used are any pyridine-2-carboxylic acid ester-3-carboxylic acid halides. In particular mention may be made of quinolinic acid-2-methyl ester-3-chloride, quinolinic acid-2-ethyl ester-3-bromide and phenyl-quinolinic acid-2-ethylester-3-halide. These compounds can be prepared from the corresponding acids by methods of themselves known. Thus, for instance the nitriles can be obtained from the corresponding halogen compounds by reaction with potassium cyanide, for example, quinolinic acid-2-nitrile from 2-chloro-pyridine-3-carboxylic acid. The carboxylic acid halides can be prepared from the corresponding acids for instance with the aid of thionyl chloride, phosphorous halides and the like. The reaction between the carboxylic acid halides and the diazomethane preferably takes place in the presence of solvents, such as ethers, hydrocarbons, halogen hydrocarbons and the like. In this manner, pyridine-3-diazoketones are obtained which can be converted into acid esters by means of alcohols. For this reaction, any alcohols may be used, for example, aliphatic, araliphatic, alicyclic, or heterocyclic alcohols and among others, basically substituted alcohols, such as dialkylamino-alkanols. The reactions described are carried out by known methods of working (reference may be made, for example, to German Patent 630,953; Berichte der Deutschen Chemischen Gesellschaft, vol. 60, page 1364; vol. 61, page 1122; vol. 68, page 200; vol. 69, page 1074; Zeitschrift für angewandte Chemie, vol. 40, page 1101).

In the compounds thus obtained, an esterified carboxyl group is to be found in the 2 position. The corresponding 2-carboxylic acids may be obtained by means of hydrolyzing agents. By means of decarboxylating agents or reactions (for example, by heating in the presence or absence of solvents, catalysts, etc.), carbon dioxide is eliminated from the 2-position, and pyridine-3-acetic acid or its derivatives—not substituted in the 2 position—are obtained.

The products of the present invention can find therapeutic application as such or can serve as intermediate products in the manufacture of medicaments. They exhibit strong parasympaticotropic action.

The following examples illustrate the invention, the parts being by weight:

Example 1

163 gms. of quinolinic acid-2-methyl ester-3-chloride are dropped into a solution of 78.8 gms. diazomethane in 4 litres of methylene chloride whilst stirring and cooling well. After allowing the reaction mixture to stand for 2 hours, the methylene chloride is removed by distillation, finally under reduced pressure. The pyridine-2-carbomethoxy-3-diazomethyl-ketone remaining is a brown oil which forms a crystalline solid on cooling. For purification purposes it can be triturated with ice-cold methanol, filtered at the pump and washed with methanol and ether. This diazoketone is a pale yellow crystalline powder which melts at 68–70° C. and decomposes at about 100° C. Purification is, however, unnecessary for its further working up. The crude diazoketone is dissolved in 500 ccs. of methanol, and the solution is shaken at about 50° C. whilst additions of a paste of silver oxide in methanol are made from time to time until the calculated quantity of nitrogen has been eliminated. The methanol is evaporated, the residue is taken up in ether and the oil which remains after evaporation of the ether is distilled in vacuo. The pyridine-2-carbomethoxy-3-acetic acid methyl ester obtained is a pale yellow oil of boiling point 98–102° C. at 0.07 mm. pressure.

10.5 gms. of this ester are boiled under reflux for a short time with 10 ccs. water and 12.5 ccs. of a solution of caustic soda of ten times normal strength. After addition of 25 ccs. of hydrochloric acid of 5 times normal strength, the reaction mixture is cooled, the pyridine-2-carboxy-3-acetic acid, the β-homoquinolinic acid, separates as a crystalline powder. It contains 1 molecule of water of crystallization and melts (after drying in vacuo at 110° C.) at 187° C. with decomposition.

1 part of the anhydrous acid is heated with 5 parts of dimethylaniline at 160–180° C., 1 molecule of carbonic acid being eliminated in a short time. By adding ether, pyridine-3-acetic acid may be precipitated from the reaction product. After recrystallization from alcohol, this substance is obtained as a crystalline powder, M. P. 143–144° C.

The same compound is obtained when starting from quinolinic acid-2-ethylester-3-chloride. Instead of with methanol, the diazo ketone can be reacted with other alcohols, such as ethylalcohol, butyl alcohol, benzyl alcohol, cyclohexanol or furyl carbinol, whereby the corresponding esters of the pyridine-3-acetic acids are obtained.

*Example 2*

10 parts of the pyridine-2-carbomethoxy-3-acetic acid methylester described in Example 1 are partially saponified under mild alkaline or acid conditions, and pyridine-2-carboxylic acid-3-acetic acid methyl ester is then isolated in the usual manner. It is fairly readily soluble in water and on melting, forms pyridine-3-acetic acid methyl ester of boiling point 112° C. under 11 mm. pressure, with elimination of carbonic acid.

In a quite analogous manner other esters, for example, pyridine-3-acetic acid ethyl ester (boiling point 122° C. under 13 mm. pressure), pyridine-3-acetic acid-propyl ester (boiling point 140° C. under 10 mm. pressure), pyridine-3-acetic acid isopropyl ester (boiling point 134° C. under 10 mm. pressure), pyridine-3-acetic acid allyl ester (boiling point 138° C. under 14 mm. pressure), pyridine-3-acetic acid butyl ester (boiling point 147° C. under 13 mm. pressure), pyridine-3-acetic acid isobutyl ester boiling point 142° C. under 13 mm. pressure) or also pyridine-3-acetic acid-benzylester, pyridine-3-acetic acid-cyclohexanolester and pyridine-3-acetic acid furylcarbinol ester may be obtained.

Parent substances which are especially suitable for the present process are those which have, in the 2 position, a relatively easily saponified ester group and, in the 3 position, a relatively difficultly saponified one, such as pyridine-2-carbomethoxy-3-acetic acid butyl ester (prepared for example, from pyridine-3-carboxylic acid chloride-2-carboxylic acid methyl ester and diazomethane, and reaction of the diazoketone thus obtained with butyl alcohol) and the like.

What we claim is:

1. A process for the preparation of a pyridine-3-acetic acid, which comprises reacting a pyridine-2-carboxylic acid ester-3-carboxylic acid halide with diazomethane, reacting the resulting diazoketone with an alcohol, treating the reaction product thus obtained with a hydrolyzing agent, partially decarboxylating the resultant dicarboxylic acid, and recovering the resultant pyridine-3-acetic acid.

2. A process for the preparation of a pyridine-3-acetic acid, which comprises reacting a pyridine-2-carboxylic acid ester-3-carboxylic acid halide with diazomethane, reacting the resulting diazoketone with an alcohol in the presence of a catalyst, treating the reaction product thus obtained with a hydrolyzing agent, partially decarboxylating the resultant dicarboxylic acid, and recovering the resultant pyridine-3-acetic acid.

3. A process for the preparation of a pyridine-3-acetic acid, which comprises reacting pyridine-2-carboxylic acid methyl ester-3-carboxylic acid chloride with diazomethane, reacting the resulting diazoketone with methanol in the presence of silver oxide, treating the pyridine-2-carbomethoxy-3-acetic acid methyl ester thus obtained with a hydrolyzing agent, partially decarboxylating the resultant pyridine-2-carboxy-3-acetic acid, and recovering the resultant pyridine-3-acetic acid.

4. A process for the preparation of a pyridine-3-acetic acid ester, which comprises reacting a pyridine-2-carboxylic acid ester-3-carboxylic acid halide with diazomethane, reacting the resulting diazoketone with an alcohol in the presence of a catalyst, treating the reaction product thus obtained with a mild hydrolyzing agent which transforms the group in the 2-position into a free carboxyl group, decarboxylating the resultant pyridine-2-carboxy-3-acetic acid ester, and recovering the resultant pyridine-3-acetic acid ester.

5. A process for the preparation of pyridine-3-acetic acid methyl ester, which comprises reacting pyridine-2-carboxylic acid methyl ester-3-carboxylic acid chloride with diazomethane, reacting the resulting diazoketone with methanol in presence of silver oxide, treating the pyridine-2-carbomethoxy-3-acetic acid methyl ester thus obtained with a mild hydrolyzing agent which transforms the 2-carbomethoxy group into a free carboxyl group, decarboxylating the resultant pyridine-2-carboxy-3-acetic acid methyl ester, and recovering the resultant pyridine-3-acetic acid methyl ester.

6. A process for the preparation of pyridine-3-acetic acid butyl ester, which comprises reacting pyridine-2-carboxylic acid methyl ester-3-carboxylic acid chloride with diazomethane, reacting the resulting diazoketone with butyl alcohol in presence of silver oxide, treating the pyridine-2-carbomethoxy-3-acetic acid butyl ester thus obtained with a mild hydrolyzing agent which transforms the 2-carbomethoxy group into a free carboxyl group, decarboxylating the resultant pyridine-2-carboxy-3-acetic acid butyl ester, and recovering the resultant pyridine-3-acetic acid butyl ester.

7. In a process for the preparation of a pyridine-3-acetic acid and its esters, the steps of reacting a pyridine-2-carboxylic acid ester-3-carboxylic acid halide with diazomethane, reacting the resulting diazoketone with an alcohol, treating the reaction product thus obtained with a hydrolyzing agent to form a compound of the structure
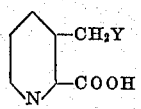
and decarboxylating to form a compound of the formula
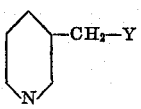
Y in each of the above formulae representing a member selected from the group consisting of carboxyl and esterified carboxyl.
MAX HARTMANN.
KARL MIESCHER.
HANS KAEGI.
WERNER BOSSHARD.